(12) United States Patent
Pham et al.

(10) Patent No.: US 11,220,616 B2
(45) Date of Patent: Jan. 11, 2022

(54) BARRIER FILMS

(75) Inventors: Hoang T. Pham, Painesville, OH (US);
Thomas Laney, Spencerport, NY (US);
Farid F. Ghiam, Beachwood, OH (US);
Kevin O. Henderson, Willoughby Hills, OH (US)

(73) Assignee: Avery Dennison Corporation, Glendale, CA (US)

( * ) Notice: Subject to any disclaimer, the term of this patent is extended or adjusted under 35 U.S.C. 154(b) by 517 days.

(21) Appl. No.: 14/238,785

(22) PCT Filed: Aug. 14, 2012

(86) PCT No.: PCT/US2012/050720
§ 371 (c)(1),
(2), (4) Date: Feb. 13, 2014

(87) PCT Pub. No.: WO2013/028398
PCT Pub. Date: Feb. 28, 2013

(65) Prior Publication Data
US 2014/0194024 A1    Jul. 10, 2014

Related U.S. Application Data

(60) Provisional application No. 61/525,439, filed on Aug. 19, 2011.

(51) Int. Cl.
*C09D 145/00* (2006.01)
*B32B 27/08* (2006.01)
(Continued)

(52) U.S. Cl.
CPC ............ *C09D 145/00* (2013.01); *B32B 5/022* (2013.01); *B32B 27/08* (2013.01); *B32B 27/12* (2013.01);
(Continued)

(58) Field of Classification Search
CPC ....... C09D 145/00; B32B 27/08; B32B 27/12; B32B 27/32
See application file for complete search history.

(56) References Cited

U.S. PATENT DOCUMENTS 2,847,845 A     6/1956   Frank et al.
3,510,464 A     5/1970   Sato
(Continued)

FOREIGN PATENT DOCUMENTS

CN      101687584      3/2010
CN      102476493      5/2012
(Continued)

OTHER PUBLICATIONS

International Search Report and Written Opinion of the International Searching Authority, dated Apr. 19, 2012.
(Continued)

*Primary Examiner* — Jeremy R Pierce

(57) ABSTRACT

Various polymeric barrier compositions are described which when formed into films, are useful in reducing transmission of odors. The films can be incorporated into a wide range of products such as multilayer barrier films used in medical applications and particularly in ostomy appliances. In certain versions, the films include semi-crystalline cyclic olefin copolymers.

33 Claims, 1 Drawing Sheet

(51) Int. Cl.
*B32B 27/12* (2006.01)
*B32B 27/32* (2006.01)
*B32B 5/02* (2006.01)
*B32B 27/30* (2006.01)
*B32B 27/18* (2006.01)

(52) U.S. Cl.
CPC ............ *B32B 27/18* (2013.01); *B32B 27/302* (2013.01); *B32B 27/306* (2013.01); *B32B 27/32* (2013.01); *B32B 27/325* (2013.01); *B32B 27/327* (2013.01); *B32B 2274/00* (2013.01); *B32B 2307/7145* (2013.01); *B32B 2307/7244* (2013.01); *B32B 2307/7246* (2013.01); *B32B 2307/7248* (2013.01); *B32B 2535/00* (2013.01); *Y10T 428/249921* (2015.04); *Y10T 428/31855* (2015.04); *Y10T 428/31909* (2015.04); *Y10T 428/31913* (2015.04); *Y10T 442/676* (2015.04)

(56) References Cited

U.S. PATENT DOCUMENTS

| | | | |
|---|---|---|---|
| 3,560,461 | A | 2/1971 | Mukumoto et al. |
| 3,585,177 | A | 6/1971 | Gardner et al. |
| 3,595,740 | A | 7/1971 | Gerow |
| 3,985,826 | A | 10/1976 | Futamura |
| 4,034,079 | A | 7/1977 | Schoonman |
| 4,237,114 | A | 12/1980 | Cardarelli |
| 4,254,169 | A | 3/1981 | Schroeder |
| 4,572,854 | A * | 2/1986 | Dallmann ............... B32B 27/08 428/349 |
| 4,687,711 | A | 8/1987 | Vietto et al. |
| 4,977,022 | A * | 12/1990 | Mueller ................. B65D 85/40 428/349 |
| 4,983,171 | A | 1/1991 | Schirmer |
| 5,093,164 | A | 3/1992 | Bauer et al. |
| 5,218,049 | A | 6/1993 | Yamamoto et al. |
| 5,300,352 | A | 4/1994 | Honma |
| 5,371,158 | A | 12/1994 | Rohrmann et al. |
| 5,407,713 | A | 4/1995 | Wilfong et al. |
| 5,455,091 | A | 10/1995 | Oreglia et al. |
| 5,470,624 | A | 11/1995 | Oreglia et al. |
| 5,496,295 | A | 3/1996 | Wilfong et al. |
| 5,532,030 | A | 7/1996 | Hirose et al. |
| 5,567,488 | A | 10/1996 | Allen et al. |
| 5,567,489 | A | 10/1996 | Allen et al. |
| 5,567,495 | A | 10/1996 | Modak et al. |
| 5,643,375 | A | 7/1997 | Wilfong et al. |
| 5,658,625 | A | 8/1997 | Bradfute et al. |
| 5,708,083 | A | 1/1998 | Furushima et al. |
| 5,730,919 | A | 3/1998 | Wilfong et al. |
| 5,766,699 | A | 6/1998 | Ohtsuki et al. |
| 5,912,070 | A | 6/1999 | Miharu et al. |
| 5,929,133 | A | 7/1999 | Watanabe et al. |
| 5,983,604 | A | 11/1999 | Wilfong et al. |
| 5,993,949 | A | 11/1999 | Rosenbaum et al. |
| 6,042,906 | A | 3/2000 | Itoh et al. |
| 6,068,936 | A | 5/2000 | Peiffer et al. |
| 6,143,383 | A | 11/2000 | Giori |
| 6,258,423 | B1 | 7/2001 | Giori |
| 6,294,609 | B1 | 9/2001 | Bertin et al. |
| 6,312,772 | B1 | 11/2001 | Kuder et al. |
| 6,329,047 | B1 | 12/2001 | Beer et al. |
| 6,455,161 | B1 | 9/2002 | Regnier et al. |
| 6,489,016 | B2 | 12/2002 | Kishine |
| 6,579,584 | B1 | 6/2003 | Compton |
| 6,620,474 | B1 | 9/2003 | Regnier et al. |
| 6,812,292 | B2 | 11/2004 | Matsukawa et al. |
| 6,852,100 | B1 | 2/2005 | Gent et al. |
| 6,884,480 | B2 | 4/2005 | Bradfute et al. |
| 6,921,563 | B2 | 7/2005 | Goerlitz et al. |
| 6,984,442 | B2 | 1/2006 | Brebion et al. |
| 7,147,845 | B2 | 12/2006 | Capelli |
| 7,270,860 | B2 | 9/2007 | Giori |
| 7,271,209 | B2 | 9/2007 | Li |
| 7,288,316 | B2 | 10/2007 | Jester |
| 7,524,910 | B2 | 4/2009 | Jiang |
| 7,531,594 | B2 | 5/2009 | Lin |
| 7,605,217 | B2 | 10/2009 | Datta et al. |
| 7,629,416 | B2 | 12/2009 | Li et al. |
| 7,645,505 | B2 | 1/2010 | Bekele et al. |
| 7,863,264 | B2 | 1/2011 | Nielsen et al. |
| 7,998,579 | B2 | 8/2011 | Lin |
| 8,022,144 | B2 | 9/2011 | Chang et al. |
| 8,092,877 | B2 | 1/2012 | Jester et al. |
| 2,459,377 | A1 | 6/2012 | Bekele |
| 8,192,813 | B2 | 6/2012 | Runyan |
| 8,206,818 | B2 | 6/2012 | Bekele et al. |
| 8,299,193 | B2 | 10/2012 | Suzuki et al. |
| 8,377,529 | B2 | 2/2013 | Bekele |
| 8,435,642 | B2 | 5/2013 | Bekele |
| 8,562,885 | B2 | 10/2013 | Dooley |
| 8,663,799 | B2 | 3/2014 | Lin |
| 8,900,719 | B2 | 12/2014 | Pham |
| 9,283,735 | B2 | 3/2016 | Pham |
| 9,481,143 | B2 | 11/2016 | Dooley |
| 2003/0118758 | A1 * | 6/2003 | Chen .................. B32B 1/02 428/35.2 |
| 2003/0124289 | A1 | 7/2003 | Yamamoto et al. |
| 2003/0186955 | A1 | 10/2003 | Nielsen et al. |
| 2003/0223657 | A1 | 12/2003 | Belias et al. |
| 2004/0071916 | A1 * | 4/2004 | Romanowski ........... A62D 5/00 428/40.1 |
| 2004/0186214 | A1 | 9/2004 | Li |
| 2004/0247915 | A1 * | 12/2004 | Wuest .................... B32B 27/16 428/515 |
| 2004/0260001 | A1 | 12/2004 | Lin |
| 2005/0119364 | A1 * | 6/2005 | Grah ..................... B29C 71/04 522/150 |
| 2005/0244665 | A1 | 11/2005 | Rivett |
| 2005/0249791 | A1 | 11/2005 | Hobbs |
| 2006/0008643 | A1 | 1/2006 | Lin |
| 2006/0062946 | A1 | 3/2006 | Beer et al. |
| 2006/0210739 | A1 | 9/2006 | Loffler et al. |
| 2006/0211804 | A1 | 9/2006 | Kim |
| 2006/0247331 | A1 | 11/2006 | Lundmark et al. |
| 2006/0251876 | A1 | 11/2006 | Goerlitz et al. |
| 2007/0021566 | A1 | 1/2007 | Tse |
| 2007/0040350 | A1 | 2/2007 | Bertrand et al. |
| 2007/0055015 | A1 | 3/2007 | Flood et al. |
| 2007/0110853 | A1 | 5/2007 | Bekele |
| 2007/0202337 | A1 | 8/2007 | Lischefski et al. |
| 2007/0237916 | A1 | 10/2007 | Rasmussen et al. |
| 2008/0152837 | A1 | 6/2008 | Chien et al. |
| 2008/0220036 | A1 | 9/2008 | Miltz et al. |
| 2008/0281045 | A1 | 11/2008 | Zhang |
| 2008/0292225 | A1 | 11/2008 | Dayrit |
| 2009/0036862 | A1 | 2/2009 | Grimm |
| 2009/0163632 | A1 | 6/2009 | Hatke et al. |
| 2009/0208685 | A1 * | 8/2009 | Rivers .................... B32B 15/08 428/36.91 |
| 2009/0216207 | A1 | 8/2009 | Nielsen |
| 2010/0012190 | A1 | 5/2010 | Rasmussen et al. |
| 2010/0119746 | A1 | 5/2010 | Igarashi |
| 2010/0121290 | A1 | 5/2010 | Rasmussen et al. |
| 2010/0215879 | A1 | 8/2010 | Dooley |
| 2010/0236090 | A1 | 9/2010 | Grimm |
| 2010/0272831 | A1 | 10/2010 | Cabedo et al. |
| 2011/0027428 | A1 | 2/2011 | Bekele |
| 2011/0213048 | A1 | 9/2011 | Yoo et al. |
| 2011/0256373 | A1 * | 10/2011 | Tatarka ................... B32B 27/08 428/218 |
| 2012/0021151 | A1 | 1/2012 | Tatarka et al. |
| 2012/0258326 | A1 | 10/2012 | Pham |
| 2013/0025764 | A1 | 1/2013 | Henderson |
| 2013/0156983 | A1 | 6/2013 | Pham |
| 2014/0044906 | A1 | 2/2014 | Dooley |
| 2015/0018788 | A1 | 1/2015 | Pham |

(56) References Cited

U.S. PATENT DOCUMENTS

| | | |
|---|---|---|
| 2015/0225151 A1 | 8/2015 | Osborn |
| 2015/0282978 A1 | 10/2015 | Henderson |

FOREIGN PATENT DOCUMENTS

| | | |
|---|---|---|
| DE | 10101902 | 7/2002 |
| EP | 0437152 | 7/1991 |
| EP | 0518542 | 9/1996 |
| EP | 0485893 | 4/1998 |
| EP | 0617665 | 3/1999 |
| EP | 0911150 | 5/1999 |
| EP | 0719209 | 1/2000 |
| EP | 0719210 | 1/2000 |
| EP | 0974453 | 4/2000 |
| EP | 0433060 | 5/2000 |
| EP | 0765909 | 3/2001 |
| EP | 0800914 | 7/2002 |
| EP | 0824067 | 10/2003 |
| EP | 1391294 | 2/2004 |
| EP | 1398149 | 3/2004 |
| EP | 0765219 | 4/2004 |
| EP | 1426181 A1 * | 6/2004 ............. B32B 27/32 |
| EP | 0958916 | 8/2004 |
| EP | 1322168 | 11/2004 |
| EP | 1081058 | 12/2004 |
| EP | 1487634 | 12/2004 |
| EP | 0970672 | 3/2005 |
| EP | 1364777 | 8/2005 |
| EP | 1682350 | 7/2006 |
| EP | 1687355 | 8/2006 |
| EP | 1622765 | 10/2006 |
| EP | 1422057 | 1/2007 |
| EP | 1525092 | 5/2007 |
| EP | 1825997 | 8/2007 |
| EP | 1196482 | 1/2008 |
| EP | 1944331 | 7/2008 |
| EP | 1983948 | 10/2008 |
| EP | 1985585 | 10/2008 |
| EP | 2176137 | 4/2010 |
| EP | 2001671 | 5/2010 |
| EP | 1531987 | 12/2011 |
| EP | 2164898 | 8/2012 |
| EP | 2050771 | 4/2013 |
| EP | 1958973 | 6/2014 |
| JP | 198089336 | 7/1980 |
| JP | 60-1246 | 7/1985 |
| JP | 1989186804 | 7/1989 |
| JP | 04148640 | 5/1992 |
| JP | 1992359028 | 12/1992 |
| JP | 5051468 | 3/1993 |
| JP | 5132590 | 5/1993 |
| JP | 05140369 | 6/1993 |
| JP | 8333466 | 12/1996 |
| JP | 10129736 | 5/1998 |
| JP | 10272742 | 10/1998 |
| JP | 1989306473 | 12/1998 |
| JP | 11309822 | 11/1999 |
| JP | 2000128112 | 5/2000 |
| JP | 2000211066 | 8/2000 |
| JP | 2001038862 | 2/2001 |
| JP | 2001072717 | 3/2001 |
| JP | 2001293816 | 10/2001 |
| JP | 2001301093 | 10/2001 |
| JP | 2003011303 | 1/2003 |
| JP | 2004262226 | 9/2004 |
| JP | 2008036863 | 2/2008 |
| JP | 2008068877 | 3/2008 |
| JP | 2008174576 | 7/2008 |
| JP | 2008195890 | 8/2008 |
| JP | 2009003439 | 1/2009 |
| JP | 2009051922 | 3/2009 |
| JP | 2009175721 | 8/2009 |
| JP | 2009227810 | 10/2009 |
| JP | 2011043628 | 3/2011 |
| JP | 2011111573 | 6/2011 |
| KR | 20080051547 | 6/2008 |
| WO | 9216358 | 10/1992 |
| WO | WO1996029361 | 9/1996 |
| WO | WO1999054133 | 10/1999 |
| WO | WO2003018312 | 3/2003 |
| WO | WO2003040442 | 5/2003 |
| WO | WO2003055678 | 7/2003 |
| WO | WO2003055681 | 7/2003 |
| WO | WO2005042241 | 12/2005 |
| WO | WO2006009360 | 1/2006 |
| WO | WO2008128896 | 10/2008 |
| WO | WO2008139593 | 11/2008 |
| WO | 2009/105205 | 8/2009 |
| WO | WO200910520 | 8/2009 |
| WO | WO2009096921 | 8/2009 |
| WO | WO2011129982 | 10/2011 |
| WO | 2011/162414 | 12/2011 |

OTHER PUBLICATIONS

Li, et al., "Antimicrobial nanomaterials for water disinfection and microbial control: Potential applications and implications", Water Research 42 (2008) 4591-4602.

Choi, et al., "The inhibitory effects of silver nanoparticles, silver ions, and silver chloride colloids on microbia growth", Water Research 42 (2008) 3066-304; Mar. 4, 2008.

Tallury, et al., "Effects of solubilizing surfactants and loading of antiviral antimicrobial, and antifungal drugs on their release rates from ethylene vinyl acetate copolymer", Dental Materials, 23, (20070 977-982).

Brzeziński, et al., Bacteriostatic textile-polymeric coat materials modified with nanoparticles, Polimery, 52 (2007) 362-366.

Uttarwar, et al., "Fabrication of Porous, Drug-Releasing, Biodegradable, Polymer Scaffolds for Sustained Drug Release", Journal of Biomedical Materials Research Part B Applied Biomaterials, 1, (2008), vol. 87B, 121-131.

Ruggeri, et al., "Synthesis, characterization, and in vitro activity of antibiotic releasing polyurethanes to prevent bacterial resistance", Journal of Biomedical Materials Research Part A, 2, (2007), vol. 81A, 287-298.

Tallury, et al., "Poly(ethylenecovinyl acetate) copolymer matrix for delivery of chlorhexidine and acyclovir drugs for use in the oral environment: Effect of drug combination, copolymer composition and coating on the drug release rate", Dental Materials, 23 (2007) vol. 23, 404-409.

Zakharova, et al, "Use of Ethylene-Vinyl Acetate Copolymers for Creating Long-Acting Therapeutic Systems with Controlled Release of Agents (Review)", Pharmeceutical Chemistry Journal, 11, (1993) vol. 27.

Li, et al., "In vitro drug release study of methacrylate polymer blend system: effect of polymer blend composition, drug loading and solubilizing surfactants on drug release", Journal of Materials Science: Materials in Medicine, 2, (2010) vol. 21, 583-588.

International Search Report, dated Oct. 10, 2012.

Written Opinion of the International Searching Authority, dated Oct. 10, 2012.

Mistry, Development of LDPE-based Antimicrobial Films for Food Packaging, Jul. 2006.

International Search Report and Written Opinion of the International Searching Authority, dated May 16, 2013.

International Search Report and Written Opinion dated Oct. 31, 2012, issued in corresponding International Application No. PCTUS1250720.

M. B. Fedorov et al: "Antimicrobial activity of coresheath surgical sutures modified with poly-3-hydroxybutyrate, Applied Biochemistry and Microbiology, vol. 43, No. 6, (Nov. 1, 2007). pp. 611-615."

* cited by examiner

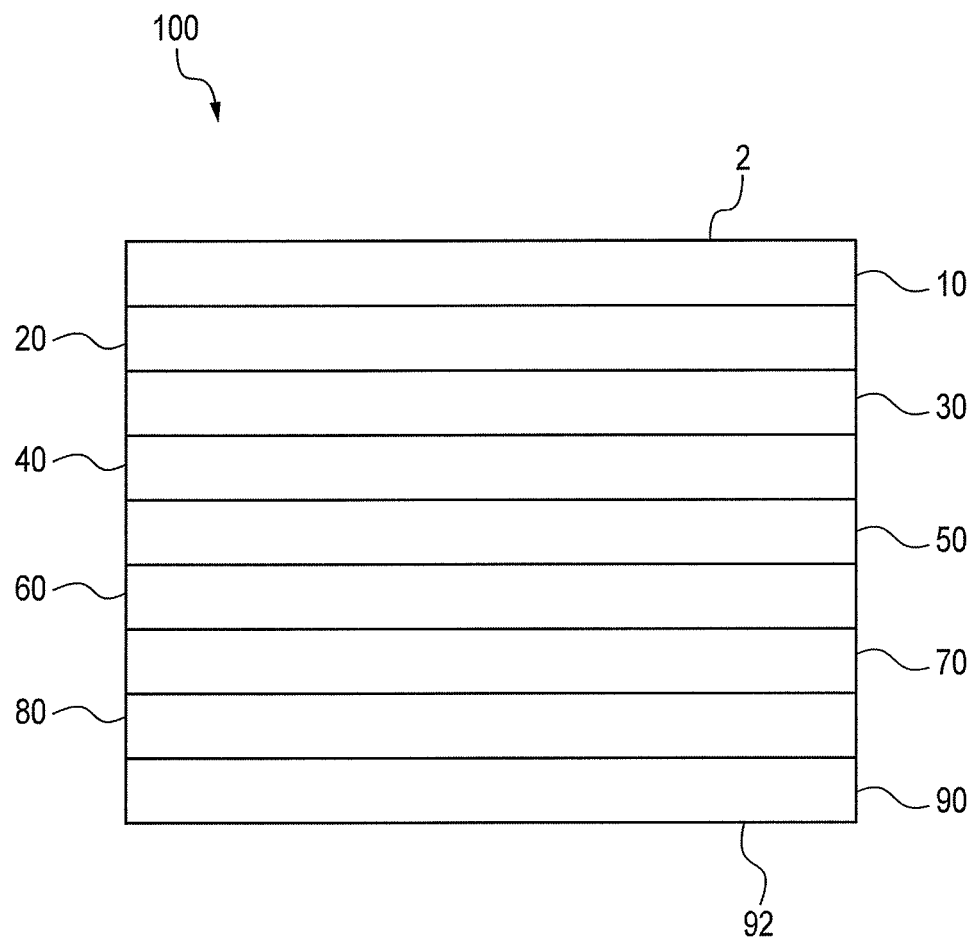

BARRIER FILMS

CROSS-REFERENCE TO RELATED APPLICATION

The present application is a 371 of International Application No. PCT/US2012/050720, which was published in English on Feb. 28, 2013, which claims priority to U.S. Provisional Patent Application No. 61/525,439 filed Aug. 19, 2011, which is incorporated herein by reference in its entirety.

FIELD

The present subject matter relates to polymeric barrier films for reducing transmission of odors. The subject matter also relates to articles comprising such films. The subject matter additionally relates to methods for reducing transmission of odors by use of the polymeric barrier films. The films, articles, and methods associated therewith are useful in various fields such as medical and health care applications, and find particular application in ostomy appliances and devices.

BACKGROUND

Barrier films in medical applications and particularly as used in ostomy applications, typically contain halogens. An example of a material used in such applications is polyvinylidene chloride (PVDC). Although use of that material is satisfactory in many regards, films containing halogens such as chloride and bromide are difficult and costly to recycle. In fact, with increasing environmental awareness, many regulations prohibit the disposal of halogens, thereby further increasing the inconvenience and/or cost of handling used medical products containing halogens.

Many currently known barrier films and particularly those used in certain medical applications, employ one or more layers that contain amorphous cyclic olefin copolymers (COCs). These materials provide an effective barrier to odor producing compounds such as skatole or 3-methylindole. However, incorporating COCs into a thin multilayer film presents a formidable technical challenge, particularly if other characteristics of the film are to be maintained such as flexibility, strength, and ability to be joined with other material(s) to form articles or goods. Accordingly, a need remains for a barrier film that provides comparable or superior odor blocking properties as currently known barrier films, without compromising flexibility, strength, and other characteristics.

SUMMARY

The difficulties and drawbacks associated with previously known barrier films and products using such films are addressed in the present compositions, films, and methods.

In one aspect, the subject matter provides a barrier film comprising a semi-crystalline cyclic olefin copolymer (COC) having a melting temperature (Tm) of from about 70° C. to about 100° C., and a glass transition temperature (Tg) of from about −20° C. to about 32° C. The cyclic olefin copolymer has a norbornene content of from about 5 mole % to about 25 mole %.

In another aspect, the subject matter provides a multilayer barrier film comprising at least one layer including a semi-crystalline cyclic olefin copolymer (COC) having a melting temperature (Tm) of from about 70° C. to about 100° C., and a glass transition temperature (Tg) of from about −20° C. to about 32° C. The cyclic olefin copolymer has a norbornene content of from about 5 mole % to about 25 mole %.

In yet another aspect, the subject matter provides a multilayer barrier film comprising a barrier layer including ethylene vinyl alcohol (EVOH), at least one flexible support layer including one or more polyolefins, an antimicrobial layer including at least one antimicrobial agent, and at least one layer including a semi-crystalline cyclic olefin copolymer (COC).

In still another aspect, the present subject matter provides a method for reducing transmission of odorous species. The method comprises providing a semi-crystalline cyclic olefin copolymer (COC), forming a film including the semi-crystalline COC, and positioning the film between a source of odorous species and a user.

As will be realized, the subject matter is capable of other and different embodiments and its several details are capable of modifications in various respects, all without departing from the subject matter. Accordingly, the drawings and description are to be regarded as illustrative and not restrictive.

BRIEF DESCRIPTION OF THE DRAWINGS

FIG. 1 is a schematic perspective view of a preferred embodiment multilayer polymeric film according to the present subject matter.

DETAILED DESCRIPTION OF THE EMBODIMENTS

Generally, in accordance with the present subject matter, various preferred embodiment single and multilayer films have been identified that can be used in a wide range of applications and particularly ostomy applications.

The preferred embodiment barrier films and/or multilayer barrier assemblies are preferably halogen-free and are particularly well suited for medical applications such as forming ostomy pouches. Since the films and multilayer assemblies are halogen-free and particularly free of chlorine, they can be recycled and/or subjected to a wide array of material reclamation operations. In addition, the unique barrier materials and combination of barrier layers and/or other functional layers as described herein are particularly well suited for use in ostomy applications. These aspects and others are all described in greater detail as follows.

Polymeric Barrier Film

In one aspect, the present subject matter provides a unique barrier film that can be utilized in a wide range of applications in which it is desired to block the transmission of odor-producing molecules, water, and/or oxygen across the thickness of a layer. Typical barrier films use water vapor transmission rate (WVTR) and oxygen transmission rate (OTR) to characterize their barrier properties. Materials known to have good barrier properties against water and oxygen permeation have a high modulus, and thereby are "noisy". A goal of the present subject matter is to prevent the passage of hydrogen sulfide and other malodorous molecules and/or species. The solution may not require the same approach needed for achieving low WVTR and OTR.

In a preferred embodiment of the present subject matter, a polymeric barrier film is provided which comprises at least one layer comprising a semi-crystalline cyclic olefin copolymer (COC). Cyclic olefin copolymers are also known as cyclo ethylene copolymer, COC, cyclo olefin copolymer, cyclic olefin polymer, and ethylene-norbornene copolymer.

The terms "cyclic olefin copolymer" or "COC" are used interchangeably herein and include these various terms of art. It is contemplated that in certain embodiments, various norbornene-based materials may be used instead of or in addition to the COC's, as described in greater detail herein. And, in particular embodiments, an elastomeric COC is used. In other embodiments, it is preferred to utilize blends of one or more of these COCs and optionally with other materials such as polyolefins, tie components, and/or amorphous COCs as described in greater detail herein.

Presently, there exist numerous grades of commercially available cyclic olefin copolymers based on different types of cyclic monomers and polymerization methods. Cyclic olefin copolymers are typically produced by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethene. Non-limiting examples of commercially available cyclic olefin copolymers include those available from TOPAS Advanced Polymers under the designation TOPAS, Mitsui Chemical's APEL, or those formed by ring-opening metathesis polymerization of various cyclic monomers followed by hydrogenation, which are available from Japan Synthetic Rubber under the designation ARTON, and Zeon Chemical's ZEONEX and ZEONOR.

In accordance with the present subject matter, a barrier layer comprising a semi-crystalline COC is provided. In other preferred embodiments, a combination of COCs is used in one or more barrier layers. Most preferably, the combination of COCs includes a semi-crystalline COC and one or more amorphous COCs. However, the subject matter includes a combination of two or more semi-crystalline COCs and optionally further combined with one or more amorphous COCs.

Preferably, the semi-crystalline COC has a melting temperature (Tm) of from about 70° C. to about 100° C., more preferably from about 80° C. to about 90° C., and most preferably from about 82° C. to about 86° C. Preferably, the semi-crystalline COC has a glass transition temperature (Tg) of from about −20° C. to about 32° C., more preferably from about −8° C. to about 20° C., and most preferably from about 0° C. to about 12° C. In certain embodiments, it may be preferred to use a semi-crystalline COC having a glass transition temperature of from about 3° C. to about 9° C. Preferably, the semi-crystalline COC has a norbornene content of from about 5 mole % to about 25 mole %, more preferably from about 10 mole % to about 20 mole %, and most preferably from about 12 mole % to about 18 mole %. In certain embodiments it is preferred to utilize a semi-crystalline COC having a norbornene content of less than 20 mole %. In certain embodiments, it is preferred to utilize a semi-crystalline COC having a particular degree of crystallinity. For example, in certain applications it is preferred to use a semi-crystalline COC having a crystallinity of 5% or more by weight. In other applications, it is preferred to utilize a semi-crystalline COC having a crystallinity of 10% or more by weight. And in still other embodiments, it is preferred to use a semi-crystalline COC having a crystallinity of 20% or more by weight.

A most preferred semi-crystalline COC is commercially available under the designation E-140 from TOPAS. The melting temperature of the E-140 grade is about 84° C. and has a Vicat softening temperature of about 64° C. The glass transition temperature of the E-140 grade is about 6° C. The norbornene comonomer content of the E-140 grade is believed to be about 12 mole % to about 18 mole %. Details and property information regarding the E-140 grade are set forth below in Table 1.

TABLE 1

Grade E-140 Cyclic Olefin Copolymer From TOPAS

| Property | Value | Unit | Test Standard |
| --- | --- | --- | --- |
| Physical Properties | | | |
| Density | 0.940 | g/cm$^3$ | ISO 1183 |
| Melt volume rate (MVR) at 190° C. and 2.16 kg | 3.0 | cm$^3$/10 min | ISO 1133 |
| Melt volume rate (MVR) at 260° C. and 2.16 kg | 12.0 | cm$^3$/10 min | ISO 1133 |
| Hardness, shore A | 89 | — | ISO 868 |
| WVTR (23° C./85% RH) | 1.0 | g * 100 μm/m$^2$ * day | ISO 15106-3 |
| WVTR (38° C./90% RH) | 4.6 | g * 100 μm/m$^2$ * day | ISO 15106-3 |
| OTR (23° C./50% RH) | 1060 | cc * 100 μm/m$^2$ * day | ISO 15105-2 |
| Mechanical Properties | | | |
| Tensile stress at break (50 mm/min) | >19 | MPa | ISO 527-T2/1A |
| Tensile modulus (1 mm/min) | 44 | MPa | ISO 527-T2/1A |
| Tensile strain at break (50 mm/min) | >450 | % | ISO 527-T2/1A |
| Compression set (24 hr/23° C.) | 35 | % | ISO 815 |
| Compression set (72 hr/23° C.) | 32 | % | ISO 815 |
| Compression set (24 hr/60° C.) | 90 | % | ISO 815 |
| Tear strength | 47 | kN/m | ISO 34-1 |
| Puncture resistance | 44 | J | ASTM D3786-08 |
| Film Properties - 50 μm/2 mil cast film | | | |
| Tensile stress at break (machine direction) | 8.8 | Ksi | ASTM D882 |
| Tensile modulus (MD) | 5.26 | Ksi | ASTM D882 |
| Elongation at break (MD) | 640 | % | ASTM D882 |
| Tensile stress at break (transverse direction) | 7.31 | Ksi | ASTM D882 |
| Tensile modulus (TD) | 4.93 | Ksi | ASTM D882 |
| Elongation at break (TD) | 620 | % | ASTM D882 |
| Elmendorf tear (MD, 3200 grams) | 1103 | Grams | ASTM D1922 |
| Elmendorf tear (TD, 3200 grams) | 1221 | Grams | ASTM D1922 |
| Haze | 1.5 | % | ASTM D1003 |
| Gloss (60° C.) | 94 | % | ASTM D2457 |

TABLE 1-continued

Grade E-140 Cyclic Olefin Copolymer From TOPAS

| Property | Value | Unit | Test Standard |
|---|---|---|---|
| Electrical Properties | | | |
| Relative permittivity at 1 GHz | 2.24 | — | ASTM D2520/B |
| Dissipation factor at 1 GHz | 2.6E−04 | — | ASTM D2520/B |
| Dielectric strength | 4000 | V/mil | ASTM D149-97a |
| Thermal Properties | | | |
| Glass transition temperature 10° C./min | 6 | ° C. | Internal method |
| Ductile-brittle temperature | <−90 | ° C. | ISO 974 |
| Tm - melt temperature | 84 | ° C. | Internal method |
| Vicat softening temperature, VST/A50 | 64 | ° C. | ISO 306 |

As noted, in certain embodiments, it may be preferred to combine one or more semi-crystalline COCs with one or more amorphous COCs. The preferred amorphous COCs have a Tg of from about 33° C. to about 180° C., more preferably from about 45° C. to about 130° C., and most preferably from about 60° C. to about 80° C. Preferred amorphous COCs which are commercially available include grades 9506 and 8007, and particularly grade 8007F-04 from TOPAS. Details and property information for these materials are set forth below in Tables 2 and 3.

TABLE 2

Grade 9506 Cyclic Olefin Copolymer From TOPAS

| Property | Value | Unit | Test Standard |
|---|---|---|---|
| Physical Properties | | | |
| Density | 1020 | kg/m$^3$ | ISO 1183 |
| Melt volume rate (MVR) | 6.0 | cm$^3$/10 min | ISO 1133 |
| MVR test temperature | 230 | ° C. | ISO 1133 |
| MVR test load | 2.16 | Kg | ISO 1133 |
| Melt volume rate (MVR) - 2nd value | 1.0 | cm$^3$/10 min | ISO 1133 |
| MVR test temperature - 2nd value | 190 | ° C. | ISO 1133 |
| MVR test load - 2nd value | 2.16 | Kg | ISO 1133 |
| Water absorption (23° C.-sat) | 0.01 | % | ISO 62 |
| Thermal Properties | | | |
| Glass transition temperature 10° C./min | 65 | ° C. | ISO 11357-1,-2,-3 |
| Mechanical Properties (Film) | | | |
| Tensile modulus (machine direction) | 1700 | MPa | ISO 527-3 |
| Tensile modulus (transverse direction | 2000 | MPa | ISO 527-3 |
| Tensile strength @ break (machine direction) | 55 | MPa | ISO 527-3 |
| Tensile strength @ break (transverse direction) | 55 | MPa | ISO 527-3 |
| Elongation at break (machine direction) | 2.9 | % | ISO 527-3 |
| Elongation at break (transverse direction) | 3.6 | % | ISO 527-3 |
| Elmendorf tear strength (machine direction) | 230 | G | ISO 6383-2 |
| Elmendorf tear strength (transverse direction) | 240 | G | ISO 6383-2 |
| Dart Drop Impact Strength, F50 | <36 | G | ISO 7765-1 |
| Optical Properties (Film) | | | |
| Gloss, 60° | >100 | % | ISO 2813 |
| Haze | <1 | % | ISO 14782 |
| Barrier Properties (Film) | | | |
| Water vapor permeability @ 38° C., 90% RH | 0.8 | g · 100 μm/(m$^2$ · day) | ISO 15106-3 |
| Oxygen Permeability @ 23° C., 50% RH | 170.0 | cm$^3$ · 100 μm/(m$^2$ · day · bar) | ASTM D3985 |

TABLE 3

Grade 8007F-04 Cyclic Olefin Copolymer From TOPAS

| Property | Value | Unit | Test Standard |
|---|---|---|---|
| Physical Properties | | | |
| Density | 1020 | kg/m$^3$ | ISO 1183 |
| Melt volume rate (MVR) | 12.0 | cm$^3$/10 min | ISO 1133 |

TABLE 3-continued

Grade 8007F-04 Cyclic Olefin Copolymer From TOPAS

| Property | Value | Unit | Test Standard |
|---|---|---|---|
| MVR test temperature | 230 | ° C. | ISO 1133 |
| MVR test load | 2.16 | Kg | ISO 1133 |
| Melt volume rate (MVR) - 2nd value | 2.0 | cm³/10 min | ISO 1133 |
| MVR test temperature - 2nd value | 190 | ° C. | ISO 1133 |
| MVR test load -3 2nd value | 2.16 | Kg | ISO 1133 |
| Water absorption (23° C.-sat) | 0.01 | % | ISO 62 |
| Thermal Properties | | | |
| Glass transition temperature 10° C./min | 78 | ° C. | ISO 11357-1,-2,-3 |
| Mechanical Properties (Film) | | | |
| Tensile modulus (machine direction) | 2200 | MPa | ISO 527-3 |
| Tensile modulus (transverse direction) | 1800 | MPa | ISO 527-3 |
| Tensile strength @ break (machine direction) | 57 | MPa | ISO 527-3 |
| Tensile strength @ break (transverse direction) | 50 | MPa | ISO 527-3 |
| Elongation at break (machine direction) | 2.9 | % | ISO 527-3 |
| Elongation at break (transverse direction) | 3.0 | % | ISO 527-3 |
| Elmendorf tear strength (machine direction) | 225 | G | ISO 6383-2 |
| Elmendorf tear strength (transverse direction) | 230 | G | ISO 6383-2 |
| Dart Drop Impact Strength, F50 | <36 | G | ISO 7765-1 |
| Optical Properties (Film) | | | |
| Gloss, 60° | >100 | % | ISO 2813 |
| Haze | <1 | % | ISO 14782 |
| Barrier Properties (Film) | | | |
| Water vapor permeability @ 38° C., 90% RH | 0.8 | g · 100 μm/(m² · day) | ISO 15106-3 |
| Oxygen Permeability @ 23° C., 50% RH | 200.0 | cm³ · 100 μm/(m² · day · bar) | ASTM D3985 |

If one or more amorphous COCs are used in combination with the semi-crystalline COC, it preferred that the weight proportion of the semi-crystalline COC range from about 1% to about 99%, more preferably from about 5% to about 75%, and most preferably from about 10% to about 50%, based upon the total weight amount of COC's in the barrier layer. However, it will be appreciated that the subject matter includes barrier layers with less than 1% semi-crystalline COC, and greater than 99% semi-crystalline COC.

For certain applications, it may be preferred to utilize a COC having elastomeric properties. As will be appreciated, elastomers exhibit a property of viscoelasticity or as commonly referred, elasticity. Elastomers typically have a relatively low Young's modulus and a high yield strain as compared to most other materials. It is contemplated that an elastomeric COC could be used in the various embodiments described herein. Reported information for an elastomeric COC from TOPAS indicates that the COC elastomers have a tensile modulus of about 4,412 N/cm² and elongation at break greater than 450%. In addition, the elastomeric COC exhibits relatively low dielectric properties comparable to certain fluoroelastomers, thereby providing excellent electrical insulation performance. Furthermore, the material is reported to maintain ductility at temperatures below 80° C. The noted elastomeric COC also reportedly exhibits a Shore A hardness of 89.

In certain other embodiments, it is preferred to utilize ethylene vinyl alcohol (EVOH) in the polymeric barrier film. Specifically, the EVOH may be incorporated in the layer(s) comprising COC, and/or be provided in one or more separate layers proximate the COC-containing layer(s) in the barrier film. Ethylene vinyl alcohol, commonly abbreviated EVOH, is a formal copolymer of ethylene and vinyl alcohol. Because the latter monomer mainly exists as its tautomer acetaldehyde, the copolymer is prepared by polymerization of ethylene and vinyl acetate to produce the ethylene vinyl acetate (EVA) copolymer followed by hydrolysis. EVOH is typically used to provide barrier properties, primarily as an oxygen barrier for improved food packaging shelf life and as a hydrocarbon barrier for fuel tanks. EVOH is typically coextruded or laminated as a thin layer between cardboard, foil, or other plastics. EVOH copolymer is traditionally defined by the mole percent ethylene content. Lower ethylene content grades have higher barrier properties, and higher ethylene content grades have lower temperatures for extrusion. Additional information as to preferred aspects of EVOH used in the films of the subject matter are described in greater detail herein.

Multilayer Barrier

The present subject matter also provides multilayer films for use in medical applications and in particular, for ostomy applications. As will be appreciated, an important characteristic for such films is preventing or at least significantly reducing transmission of odors through the film, and particularly reducing transmission of skatole or 3-methylindole through the film. Another important characteristic for such films is that the films be relatively quiet and not emit excessive noise upon deflecting or movement of the film. A preferred multilayer barrier construction uses one or more barrier layers that include a semi-crystalline cyclic olefin copolymer (COC) and in combination with one or more flexible support layers. Another preferred multilayer barrier construction includes one or more barrier layers that include ethylene vinyl alcohol in conjunction with one or more layers which include a semi-crystalline COC. In other embodiments, the preferred multilayer barrier construction includes one or more of the previously noted aspects in further combination with an inner layer containing one or more antimicrobial agents.

FIG. 1 is a schematic illustration of a preferred embodiment multilayer barrier assembly 100 in accordance with the present subject matter. The multilayer assembly 100 comprises an outer layer 10 defining an outer face 2, a first flexible support layer 20, a second flexible support layer 30, a first moisture and odor barrier layer 40, a secondary barrier layer 50 for reducing transmission of oxygen, a second moisture and odor barrier layer 60, a third flexible support layer 70, a fourth flexible support layer 80, and an inner antimicrobial layer 90 defining an inner face 92 for contacting a microbe containing medium. Table 4 set forth below describes a preferred embodiment multilayer film and properties and materials for each of the layers 10, 20, 30, 40, 50, 60, 70, 80, and 90.

TABLE 4

Preferred Multilayer Film

| Layer | Layer Thickness % | Material | Weight % | Density | Weight % |
|---|---|---|---|---|---|
| 10 | 10.00% | 18% VA EVA | 80.00% | 0.940 | |
| | | Slip/AB | 20.00% | 1.010 | |
| | | Total: | 100.00% | 0.953 | 10.31% |
| 20 | 14.00% | Plastomer | 100.00% | 0.870 | |
| | | Total: | 100.00% | 0.870 | 13.18% |
| 30 | 14.00% | Plastomer | 100.00% | 0.870 | |
| | | Total: | 100.00% | 0.870 | 13.18% |
| 40 | 8.00% | COC Elastic | 80.00% | 0.940 | |
| | | Tie resin | 20.00% | 0.910 | |
| | | Total: | 100.00% | 0.934 | 8.08% |
| 50 | 7.00% | 44 mol EVOH | 100.00% | 1.130 | |
| | | Total: | 100.00% | 1.130 | 8.56% |
| 60 | 8.00% | COC Elastic | 80.00% | 0.940 | |
| | | Tie resin | 20.00% | 0.910 | |
| | | Total: | 100.00% | 0.934 | 8.08% |
| 70 | 9.00% | Plastomer | 100.00% | 0.870 | |
| | | Total: | 100.00% | 0.870 | 8.47% |
| 80 | 20.00% | 30% BA EBA | 60.00% | 0.930 | |
| | | Plastomer | 20.00% | 0.870 | |
| | | Tie resin | 20.00% | 0.910 | |
| | | Total: | 100.00% | 0.913 | 19.79% |
| 90 | 10.00% | 30% BA EBA | 70.00% | 0.930 | |
| | | Slip/AB | 20.00% | 1.010 | |
| | | Antimicrobial | 10.00% | 1.068 | |
| | | Total: | 100.00% | 0.958 | 10.35% |
| | 100.00% | | | 0.924 | 100% |

Layer 10 is the outermost layer and preferably comprises ethylene vinyl acetate (EVA) having a vinyl acetate content of preferably about 18%. Layer 10 also optionally contains a masterbatch of slip and anti block (AB) agents. The masterbatch is preferably SAB1220 NG masterbatch available from A. Schulman, added at about 20% by weight. The masterbatch contains 8% slip and 12% antiblock agents. The slip agent is preferably Erucamide and the antiblock agent is preferably $SiO_2$. It will be appreciated, however, that a wide array of other slip agents and/or antiblock agents could be used. Non-limiting examples of other slip agents include primary and secondary amide slip agents, polydimethyl siloxane and its copolymers, polywax slip agents, and other like agents. Non-limiting examples of other antiblock agents include inorganic fillers such as talc, calcium carbonate, clay and the like; and polymeric agents such as low density polyethylene (LDPE), highly branched low density polyeth-ylene, and other comparable components. In certain embodiments, effective amounts of ethylene butyl acrylate (EBA) can be included in layer 10. Optionally, an effective amount of a tie component can be used in this layer. If a tie component is used in layer 10, the material is preferably anhydride (M.A.) modified. An example of such a material is BYNEL E418, available from DuPont. That material is described as anhydride-modified EVA, and is believed to be maleic anhydride grafted EVA polymer. Another example is PLEXAR from Equistar which may include grated M.A. HDPE, LLDPE, PS, or PP.

Layers 20, 30, 70 and 80 are each a flexible support layer. The preferred embodiment multilayer film preferably includes multiple flexible support layers. The support layers provide bulk, strength, softness, and cohesiveness to the resulting multilayer assembly. In certain multilayer configurations, the one or more flexible support layers serve to dampen noise that might otherwise be emitted upon deformation or movement of the film. These layers preferably comprise one or more polyolefins, plastomers, styrene elastomers, and/or combinations thereof. Preferably, the flexible support layers such as layers 20, 30, 70, and 80 comprise one or more polymers having a relatively low density of from about 0.75 to about 1.10 $g/cm^3$, more preferably from about 0.85 to about 1.01 $g/cm^3$, and more preferably from about 0.865 to about 0.91 $g/cm^3$. Preferably, the polyolefins in the support layers such as layers 20, 30, 70 and 80 have a melt flow index (MI) of from about 0.1 to about 1000 g/10 min, and more preferably from about 0.5 to about 10 g/10 min. Preferably, the polyolefins used in the support layer(s) such as layers 20, 30, 70, and 80, include an ethylene based polymer with one or more alkyl comonomer(s) selected from the family of propylene, butylene, hexene, octene, and the like. The polyolefin can be a random copolymer or a block copolymer. In certain embodiments, it may be preferred to utilize one or more plastomer(s) in the support layer(s) such as layers 20, 30, 70, and 80. A plastomer is a polyolefin elastomer. A preferred plastomer is a propylene based plastomer having an alkyl comonomer in the family of ethylene, butylene, hexene, octene and the like. The noted plastomer can be a random copolymer or a block copolymer.

As noted, the flexible supports in the preferred multilayer constructions utilize a low density polyolefin and preferably, a polyolefin elastomer. A wide array of commercially available polyolefin elastomers can be used for one or more of the flexible support layers. Representative preferred examples of such materials include KRATON™ D1164P and G2832 available from Kraton Polymers US, LLC of Houston, Tex.; DOW AFFINITY™ DG8200 and EG8100; DOW VERSIFY™ 3200 and 3000; and DOW INFUSE™ such as INFUSE 9000 from Dow Chemical Corp. of Midland, Mich.; DYNAFLEX™ G2755 from GLS Corp. of McHenry, Ill.; SEPTON™ 2063 from Kuraray of Tokyo, Japan; and VISTAMAXX™ VM1100 from ExxonMobil Chemical Co. of Houston, Tex. Another preferred commercially available material for any of layers 20, 30, 70 and/or 80 is an elastomer material available from Mitsui Chemicals under the designation NOTIO™. A preferred grade is NOTIO™ PN 2070. Table 5 set forth below presents representative modulus, tear strength, and density values for films made using various specific grades of these materials.

TABLE 5

Summary of Modulus, Tear Strength and Density

| Core Resin Name | Modulus [MPa] | | Tear Strength [g] | | Density [g/cm³] |
|---|---|---|---|---|---|
| | MD | TD | MD | TD | |
| KRATON ™ D1164P | 40.3 | 9.6 | 95 | 776 | 0.96 |
| KRATON ™ G2832 | 5.0 | 1.7 | 179 | 207 | 1.01 |
| DOW AFFINITY ™ DG8200 | 8.8 | 8.1 | 150 | 188 | 0.93 |
| DOW AFFINITY ™ EG8100G | — | — | — | — | — |
| DYNAFLEX ™ G2755 | 9.8 | 3.2 | 175 | 186 | 0.89 |
| DOW VERSIFY ™ 3200 | 52.8 | 59.3 | 368 | 1026 | 0.93 |
| DOW VERSIFY ™ 3000 | 128.9 | 138.4 | 554 | 1205 | 0.87 |
| DOW INFUSE ™ 9000 | — | — | — | — | 0.88 |
| Kuraray SEPTON ™ 2063 | 8.0 | 8.1 | 83 | 56 | 1.00 |
| Exxon VISTAMAXX ™ VM1100 | 7.1 | 7.6 | 108 | 111 | 0.98 |
| Mitsui NOTIO ™ PN2070 | — | — | — | — | — |

Generally, a particular combination of properties is desired for the film material forming the flexible support(s) in the preferred ostomy multilayer film summarized in Table 4. A relatively low modulus should contribute to lower noise. Tear strength should be relatively high. Density may also be important. Typically, preferred films exhibit a modulus of less than about 9.5 MPa for MD and less than about 9 MPa for TD; a tear strength of at least about 100 g for MD and at least about 108 for TD; and a density of less than 1.1 g/cm³. Preferably, preferred films exhibit a modulus of less than or equal to about 9.3 MPa for MD and less than or equal to about 8.8 MPa for TD; a tear strength of at least or about 108 g for MD and at least or about 110 g for TD; and a density of less than or equal to 1.0 g/cm³. These combinations of properties for the materials forming the flexible supports, e.g. layers 20, 30, 70, and 80 in the preferred multilayer construction, have been found to provide a favorable combination of properties and promote ease of processing. However, the subject matter includes the use of suitable materials exhibiting only some of these properties. It will also be understood that the subject matter includes films exhibiting different properties. For example, it is contemplated that fully formed films would exhibit modulus values less than these values, and/or tear strength values that are greater than these values. The preferred materials of the group of commercially available materials listed in Table 5 are Exxon VISTAMAXX™ and Dow AFFINITY™, VERSIFY™ and INFUSE™. It will be appreciated that the present subject matter multilayer barrier constructions are not limited to the use of these particular elastomers.

In certain versions of the subject matter, it is preferred to utilize one or more styrenic elastomers in one or more of the support layers, such as layers 20, 30, 70, and 80. The one or more styrenic elastomers can be used exclusively or in combination with one or more polyolefins and/or polyolefin elastomers. An example of a commercially available styrenic elastomer is the previously noted SEPTON™ material. In certain embodiments, it may be preferred to incorporate acrylonitrile butadiene styrene (ABS) in one or more of the support layers.

One or more of layers 20, 30, 70 and 80 may also comprise ethylene butyl acrylate (EBA). A variety of different grades of EBA can be used, however, a commercially available grade under the designation LOTRYL 30 BA 02 from Arkema has been identified as providing desired characteristics. It is also contemplated that effective amounts of ethylene vinyl acetate (EVA) for example having a vinyl acetate content of about 18% or higher, can also be included in one or more of the layers 20, 30, 70, and 80. Although EBA or other acrylate, or EVA can be incorporated in any of the layers 20, 30, 70 and/or 80, it is preferred to incorporate EBA in layer 80. If EBA or EVA is incorporated in one or more layers such as layer 80, it is preferred to incorporate the EVA or EBA at a weight ratio of about 99% to about 50% with from about 1% to about 50% of polyolefin elastomer(s), i.e. plastomer(s). Most preferably, if EBA or EVA is used in layer 80, it is preferred to utilize about 60% of that material based upon the total weight of components in that layer.

In addition, one or more of layers 20, 30, 70, and 80 may also comprise a tie component. The tie component may be as previously described, and is preferably BYNEL CXA 410E710 from DuPont. Although the subject matter is not limited to any particular concentration of the tie component in any of the noted layers, a proportion of up to about 20% based upon the total weight of the respective layer is useful. As noted in Table 4, in certain embodiments it is particularly preferred to include about 20% of a tie component in layer 80.

The barrier layer 50 is primarily for reducing transmission of oxygen and/or water, preferably comprises EVOH. The EVOH is incorporated at nearly any effective concentration, however typical concentrations range from about 40% to about 100%, preferably from about 50% to about 80%, and most preferably from about 60% to about 70%. In the preferred embodiment multilayer assembly of Table 4, layer 50 includes 100% of EVOH. Layer 50 preferably comprises ethylene vinyl alcohol (EVOH) SP292, E171, and/or G176 available from Eval Americas. The EVOH used in layer 50 preferably has an ethylene content of from about 25 mole % to about 50 mole %, more preferably from about 32 mole % to about 48 mole %, and most preferably from about 35 mole % to about 48 mole %. In the embodiment detailed in Table 4, the EVOH used in layer 50 has an ethylene content of 44 mole %. As will be understood, these values are molar percents, i.e., the molar proportion of ethylene in the ethylene vinyl alcohol material used.

It is also contemplated that the barrier layer 50 may comprise one or more cyclic olefin copolymers instead of or in addition to EVOH. In certain embodiments, it may be preferred to provide an odor blocking layer that comprises one or more cyclic olefin copolymers. Although not wishing to be bound to any particular theory, it is believed that upon incorporation of a cyclic olefin copolymer, the shape of the norbornene rings in the polymeric matrix tend to trap or block odor producing molecules and/or chemical species. The use of one or more cyclic olefin copolymers in a barrier layer may be particularly desirable if water vapor transmission rate (WVTR) is not a concern for that layer.

Each of layers 40 and 60 comprises one or more semi-crystalline cyclic olefin copolymer (COC). These layers primarily function as odor barrier layers and are as previously described herein. As noted, the preferred COC is from TOPAS under the designation E-140 and has a density of 0.94 g/cc and a comonomer content of about 12 mole % to about 18 mole % norbornene. As previously noted, the E-140 COC is a semi-crystalline material and has a melting temperature of about 84° C., a Vicat softening point of about 64° C., and a glass transition temperature of about 6° C. It is also contemplated that two grades of amorphous COC from TOPAS, grade 9506F and/or grade 8007, may be blended with the E-140 grade. A non-limiting representative blend ratio of semi-crystalline COC to amorphous COC is about 50/50 by weight. The Tg of grade 8007 is 78° C. The Tg of grade 9506F is 65° C. The one or more COCs can be used in the moisture or odor barrier layer in nearly any concentration, such as from about 10% to about 100%, more preferably from about 50% to about 99%, more preferably from about 65% to about 95%, more preferably from about 70% to about 90%, and most preferably about 80%. The COCs used in layers 40 and 60 may be same as one another. Alternatively, the COCs used in these layers may be different from one another.

One or both of layers 40 and 60 preferably also comprise a tie component. Preferably, the tie component is a polymeric resin. The tie component can be used at any effective concentration, such as from about 1% to about 40% by weight, preferably from about 10% to about 30% by weight, and most preferably about 20% by weight, based upon the total weight of the respective layer, such as layer 40 or layer 60. In layers 40 and 60, the tie component is preferably BYNEL CXA410E710. It is believed that this is an anhydride modified olefin.

Layer 90 is an inner layer and preferably includes one or more antimicrobial agents. In the preferred embodiment layer film listed in Table 4, layer 90 comprises 70% EBA 30, 20% of a slip and antiblock masterbatch, and an effective amount of a silver ion anti-microbial masterbatch. In certain versions, the amount of the antimicrobial masterbatch is from about 8% to about 15%, and more preferably from about 10% to about 12%. As previously described with respect to layer 80; in layer 90, one or both of ethylene vinyl acetate (EVA) and/or ethylene butyl acrylate (EBA) can be used. If EVA is used, EVA having a vinyl acetate content of about 18% or higher is preferably utilized. For the embodiment shown in Table 4, layer 90 preferably comprises 70% EBA having a butyl acrylate content of about 30%. In layer 90, 20% by weight of the SAB1220 NG masterbatch is preferably used. The SAB1220 NG masterbatch comprises slip agent(s) and antiblock agent(s) as previously described herein. In layer 90, the anti-microbial masterbatch is ABACT 422VA from A. Schulmann. However, it is also contemplated that such anti-microbial masterbatch may be substituted with BACTIBLOCK from Nanobiomatters. The Nanobiomatters antimicrobial is a silver ion on a modified organoclay. If the BACTIBLOCK masterbatch is used, in certain embodiments it is preferred to incorporate the masterbatch in the layer at a concentration of about 12%. In certain embodiments, the antimicrobial layer also preferably comprises one or more sealable polymers such as metallocene-catalyzed linear low density polyethylene (LLDPE).

The preferred embodiment multilayer barrier film described in Table 4 and schematically depicted in FIG. 1, preferably utilizes each of layers 10, 20, 30, 40, 50, 60, 70, 80, and 90 at certain thicknesses. That is, by appropriate selection of thickness for each layer, the overall thickness of the resulting multilayer barrier is still relatively thin, yet the film exhibits excellent barrier properties. In certain embodiments, a preferred ratio of thickness for layers 10, 20, 30, 40, 50, 60, 70, 80, and 90 is 10/14/14/8/7/8/9/20/10, respectively. Other slight variations in thickness are contemplated. The total thickness of the three middle layers, i.e. layers 40, 50, and 60, is preferably about 30% or less of the total thickness of the multilayer film. Preferred film thickness for an ostomy application is about 70 to about 100 microns, but could be thinner or thicker.

In certain embodiments, the total layer thickness of layers 80 and 90 will be from about 25% to about 30% of the total thickness of the multilayer film. In certain embodiments, the layer containing EVOH, e.g. layer 50, has a thickness of from about 3% to about 10%, more preferably from about 5% to about 9%, and most preferably from about 6% to about 8% of the total thickness of the multilayer film. In certain embodiments, the total or combined thickness of layer(s) containing COC, e.g. layers 40 and 60, is from about 10% to about 40%, more preferably from about 12% to about 36%, and most preferably from about 14% to about 30% of the total thickness of the multilayer film.

Preferably, layers 80 and 90 impart heat sealability characteristics to the resulting multilayer barrier film. Preferably, at least the materials selected for these layers render the resulting multilayer barrier film weldable and most preferably thermally weldable. Accordingly, at least a portion of the materials used in layers 80 and/or 90 are polar. This enables RF welding of the multilayer assembly. One or more polar materials such as EVA or EBA are provided in the outer layer to facilitate RF welding. However, if heat sealing or other thermal means, polar compounds may not be necessary. Instead, agents such as octene-based PE's, ULDPE (non-polar), and the like can be used.

It is also contemplated that one or more ionomers and preferably zinc ionomers can be incorporated in any of the layers of the multilayer barrier film. For the embodiment depicted in Table 4, one or more ionomers can be incorporated in any of the support layers 20, 30, 70 and/or 80. Preferably and in certain embodiments, one or more ionomers are included in layer 80. It is also contemplated that one or more ionomers could be included in the secondary barrier layer 50 containing EVOH. The one or more ionomers can be used at any effective concentration. However, typically such concentrations range from about 5% to about 40%, preferably from about 10% to about 30%, and most preferably from about 15% to about 20%.

The present subject matter includes a wide array of multilayer barrier assemblies and in no way is limited to the embodiment depicted in Table 4. For example, in another preferred embodiment, a multilayer barrier film is provided in which one or more support layer(s) are disposed between a COC-containing layer and a layer containing EVOH. Representative sequences of layers in accordance with preferred embodiments of the subject matter may include:
  (i) COC/Support/EVOH/Support/COC,
  (ii) COC/Support/EVOH/Support,
  (iii) Support/EVOH/Support/COC,
  (iv) COC/EVOH/Support/COC,
  (v) COC/Support/EVOH/COC,
  (vi) COC/Support/EVOH,
  (vii) Support/EVOH/COC,
  (viii) COC/EVOH/Support, and
  (ix) Support/COC/EVOH.

Again, it is to be understood that in no way is the subject matter limited to any of the particular layer sequences noted herein. Moreover, it will also be appreciated that the subject matter includes one or more additional layers included or otherwise incorporated in the representative examples (i)-(ix) such as for instance, outer face layers and/or inner layers which may optionally include antimicrobial agents.

As stated previously, in addition to barrier properties, it is often desirable that a polymeric barrier film not emit noise when deflected, crumpled or otherwise moved. For example, in ostomy or incontinence applications, it is desirable that the ostomy or incontinence bag not emit noise. As will be appreciated, such articles are typically worn under a user's clothing so as to hide the article from view. Films or polymeric layers that are not quiet tend to emit undesirable noise when the user undergoes motion such as when walking or sitting. In the case of the preferred embodiment multilayer barrier films, the films are significantly quieter than comparable ostomy films.

The present subject matter also provides various methods. In one aspect, the subject matter provides a method for forming a polymeric barrier film with excellent barrier properties. The method generally includes providing a polymeric barrier composition. Examples of such compositions include those previously described herein. The method also includes forming a film from the polymeric barrier composition. Extrusion techniques are preferred, however other known methods can be used for forming films. As explained herein, in certain embodiments, it is preferred that the at least one polymeric barrier composition includes a semi-crystalline cyclic olefin copolymer. In other embodiments, it is preferred that the at least one polymeric barrier composition includes ethylene vinyl alcohol (EVOH). In many of the embodiments, it is preferred that the polymeric barrier composition is free of halogens.

The various layers and films can be extruded, coated, or otherwise formed by techniques known in the art. Co-extrusion techniques can also be utilized. For certain applications in which increased toughness and/or durability are desired, films can be blown.

The subject matter further provides methods of using the various compositions, films, and multilayer assemblies described herein. For example, a method for reducing transmission of odorous species is provided. The term "odorous species" as used herein refers to molecules or chemical species which are generally perceived by a user as unpleasant. A non-limiting example of odorous species is skatole or 3-methylindole. Another non-limiting example of an odorous species is hydrogen sulfide. Still another example of odorous species is 1-propanethiol. Combinations of these odorous species and potentially with other species are contemplated. The method comprises providing a semi-crystalline cyclic olefin copolymer, preferably as described herein. The method also comprises forming a film which includes the semi-crystalline cyclic olefin copolymer. And, the method also comprises positioning or placing the film between a source of the odorous species and a user. This latter operation typically involves forming the film into a container or pouch, or incorporating the film into such, and then using the container or pouch to hold, store, or collect material containing the odorous species.

The preferred embodiment barrier film constructions are believed to exhibit several advantages over currently known ostomy films. The preferred films are halogen-free and avoid the use of polyvinylidene chloride (PVDC). The preferred films are relatively quiet and exhibit significantly less "rustle". And, the preferred films exhibit superior odor blocking characteristics. Furthermore, the preferred films exhibit a combination of some and preferably all of these features. The film construction may be transparent or contain coloring agents.

The present subject matter also provides a wide array of articles using the barrier film(s) described herein. A non-limiting example of an article using the barriers described herein is an ostomy pouch. The barrier film(s) and preferably the multilayer barrier film(s) described herein can be joined with one or more other components. For example, in forming an ostomy pouch, a flexible wall container or pouch is formed from the multilayer film of Table 4. Sealed regions are formed by thermal welding contacting face regions of the film so as to form a pouch with an enclosed interior. One or more outer external protective layers may be applied along the outer face such as face 2 of the assembly depicted in FIG. 1. The external layer(s) can be fabric, nonwoven, or other materials.

Many other benefits will no doubt become apparent from future application and development of this technology.

All patents, applications, and articles noted herein are hereby incorporated by reference in their entirety.

It will be understood that any one or more feature or component of one embodiment described herein can be combined with one or more other features or components of another embodiment. Thus, the present subject matter includes any and all combinations of components or features of the embodiments described herein.

As described hereinabove, the present subject matter solves many problems associated with previously known compositions, films, multilayer assemblies, and related methods. However, it will be appreciated that various changes in the details, materials and arrangements of components and operations, which have been herein described and illustrated in order to explain the nature of the subject matter, may be made by those skilled in the art without departing from the principle and scope of the subject matter, as expressed in the appended claims.

What is claimed is:

1. A barrier film comprising:
    a first layer and second layer, wherein the first layer and the second layer comprise a semi-crystalline cyclic olefin copolymer (COC) having a melting temperature (Tm) of from about 70° C. to about 100° C., a glass transition temperature (Tg) of from about −20° C. to about 32° C., and a norbornene content of from about 5 mole % to about 25 mole %; and
    a layer of ethylene vinyl alcohol (EVOH),
    wherein the EVOH layer is disposed between the first layer and the second layer, and
    wherein the weight proportion of the semi-crystalline COC is greater than 99% based upon the total weight amount of COCs in the first and second layers.

2. The barrier film of claim 1 wherein the semi-crystalline COC has a melting temperature of from about 80° C. to about 90° C.

3. The barrier film of claim 2 wherein the semi-crystalline COC has a melting temperature of from about 82° C. to about 86° C.

4. The barrier film of claim 1 wherein the semi-crystalline COC has a glass transition temperature of from about −8° C. to about 20° C.

5. The barrier film of claim 4 wherein the semi-crystalline COC has a glass transition temperature of from about 0° C. to about 12° C.

6. The barrier film of claim 1 wherein the semi-crystalline COC has a norbornene content of from about 10 mole % to about 20 mole %.

7. The barrier film of claim 6 wherein the semi-crystalline COC has a norbornene content of from about 12 mole % to about 18 mole %.

8. The barrier film of claim 1, wherein the first and/or second layer further comprise at least one amorphous COC.

9. The barrier film of claim 8 wherein the amorphous COC has a glass transition temperature of from about 33° C. to about 180° C.

10. The barrier film of claim 9 wherein the amorphous COC has a glass transition temperature of from about 45° C. to about 130° C.

11. The barrier film of claim 10 wherein the amorphous COC has a glass transition temperature from about 60° C. to about 80° C.

12. The barrier film of claim 1 wherein the semi-crystalline cyclic olefin copolymer in the first layer is the same as the semi-crystalline cyclic olefin copolymer in the second layer.

13. The barrier film of claim 1 wherein the ethylene vinyl alcohol has an ethylene content of from about 25 mole % to about 50 mole %.

14. The barrier film of claim 13 wherein the ethylene vinyl alcohol has an ethylene content of from about 32 mole % to about 48 mole %.

15. The barrier film of claim 14 wherein the ethylene vinyl alcohol has an ethylene content of from about 35 mole % to about 48 mole %.

16. The barrier film of claim 1 further comprising:
at least one flexible support layer including one or more polymers selected from the group consisting of styrenic elastomers, polyolefins, polyolefin elastomers, and combinations thereof.

17. The barrier film of claim 16 wherein the one or more polymers has a density of from about 0.75 to about 1.10 g/cm$^3$.

18. The barrier film of claim 17 wherein the one or more polymers has a density of from about 0.85 to about 1.01 g/cm$^3$.

19. The barrier film of claim 18 wherein the density is from about 0.865 to about 0.91 g/cm$^3$.

20. The barrier film of claim 16 wherein the one or more polymers has a melt flow index of from about 0.1 to about 1,000 g/10 min.

21. The barrier film of claim 20 wherein the melt flow index is from about 0.5 to about 10 g/10 min.

22. The barrier film of claim 16 wherein the at least one flexible support layer includes a first support layer, a second support layer, a third support layer, and a fourth support layer.

23. The barrier film of claim 1 further comprising:
an antimicrobial layer including at least one antimicrobial agent.

24. The barrier film of claim 1 further comprising:
an outer layer including ethylene vinyl acetate (EVA).

25. The barrier film of claim 24 wherein the outer layer defines an outer face, the barrier film further comprising:
a protective cover layer disposed along the outer face, the protective cover layer including at least one of fabric and nonwoven material.

26. The barrier film of 16 wherein the at least one flexible support layer is disposed between the at least one layer including a semi-crystalline COC and the EVOH layer.

27. A method for reducing transmission of odorous species, the method comprising:
providing the barrier film of claim 1; and
positioning the film between a source of odorous species and a user.

28. The method of claim 27 wherein the odorous species is selected from the group consisting of skatole, hydrogen sulfide, 1-propanethiol, and combinations thereof.

29. The barrier film of claim 1 wherein an upper surface of the EVOH layer is in contact with a lower surface of the first layer having a semi-crystalline COC while a lower surface of the EVOH layer is in contact with an upper surface of the second layer having a semi-crystalline COC.

30. The barrier film of claim 1 wherein the least one layer including a semi-crystalline cyclic olefin copolymer (COC) includes a tie component comprising an anhydride-modified olefin.

31. The barrier film of claim 30 wherein the anhydride-modified olefin is an anhydride-modified ethylene vinyl acetate (EVA).

32. The barrier film of claim 1 wherein the barrier film is halogen-free.

33. A barrier film comprising:
an outer layer comprising ethylene vinyl acetate (EVA),
a first layer and second layer, wherein the first layer and the second layer comprise a semi-crystalline cyclic olefin copolymer (COC) having a melting temperature (Tm) of from about 70° C. to about 100° C., a glass transition temperature (Tg) of from about −20° C. to about 32° C., and a norbornene content of from about 5 mole % to about 25 mole %; and
a layer of ethylene vinyl alcohol (EVOH),
wherein the EVOH layer is disposed between the first layer and the second layer.

* * * * *